March 12, 1935.  F. M. CLARK  1,994,302
REFINING PROCESS
Filed Oct. 18, 1933
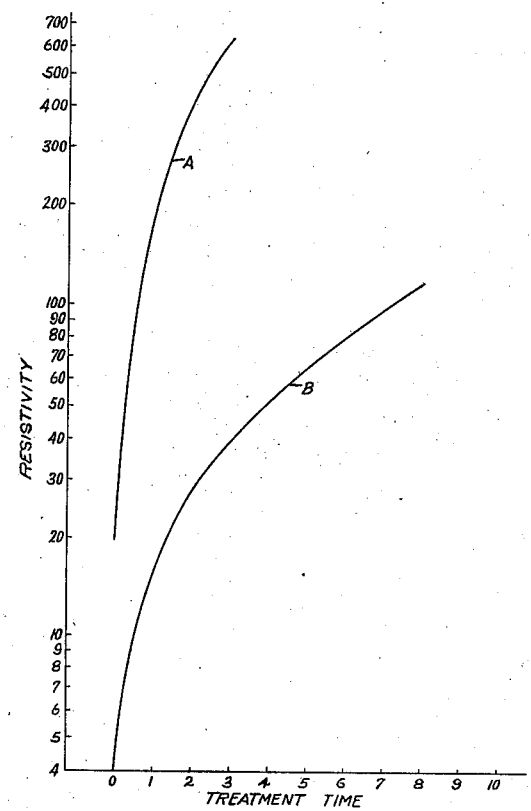
Inventor:
Frank M. Clark,
by Harry E. Dunham
His Attorney.

Patented Mar. 12, 1935

1,994,302

UNITED STATES PATENT OFFICE 1,994,302

REFINING PROCESS

Frank M. Clark, Pittsfield, Mass., assignor to General Electric Company, a corporation of New York Application October 18, 1933, Serial No. 694,096

4 Claims. (Cl. 252—1)

The present application is a continuation-in-part of my prior application Serial No. 614,196, filed May 28, 1932.

Its subject matter relates to dielectric compositions made up of halogenated organic compounds, such, for example, as chlorinated diphenyl, chlorinated benzene and chlorinated olefin, such as trichlor or tetrachlor ethylene, or a chlorinated paraffin such as pentachlor ethane.

It is the object of my invention to improve the electrical properties of these materials and in particular to increase their electrical resistivity.

It has been found that the resistivity of these compounds becomes depreciated when they become contaminated with minute amounts of dissolved or suspended impurities the nature of which is obscure. Such particles are not visible to the eye and are not necessarily evident as a discoloration. For example, a chlorinated product of this type when carefully prepared to insure a high degree of chemical purity may have an electrical resistivity of 1 to $2 \times 10^{12}$ ohms per c. m. cube when tested at 500 volts D. C. at 100° C. Upon handling such a compound in the ordinary course of transfer from a chemical factory to the point of introduction into an electrical device, such as a transformer or capacitor, the electrical resistivity may be decreased to $3 \times 10^{10}$ ohms per c. m. cube when tested at 500 volts D. C. at 100° C. The contaminating products which are not removable by ordinary filtration through paper may be derived from the containers or from the atmosphere (possibly moisture) or from pipe lines or other conveying devices employed during transfer and handling of the product. As it is not always convenient to utilize such dielectric materials directly upon distillation, it becomes important to provide a convenient purification process.

I have discovered that the high resistivity of such compounds not only can be restored but can be greatly increased after unavoidable contamination by treatment with an adsorbent material, such as fuller's earth, silica gel, or activated carbon. This is surprising as there are no visible foreign particles present which might be expected to be adapted for removal with fuller's earth, or the like.

In the accompanying drawing are shown graphs which indicate the improvement effected by the present process in two specific chlorinated products.

In carrying out my invention either one of two procedures, or a combination of them, may be used. These procedures are the following:

(1) *Percolation method.*—In accordance with this method a contaminated product which previously has been subjected to chemical purification and distillation is allowed to pass through a bed of fuller's earth or equivalent material in a contact tower. I prefer to use coarse material such as is retained by a screen of 16 to 30 meshes per square inch. The earth should be substantially dry. A percolator column about 50 to 70 inches in height and 35 to 50 inches in diameter is satisfactory. The percolation may be carried out at room temperature or higher, depending on the viscosity of the material to be treated. For example, when treating pentachlor diphenyl the percolation may be carried out at 100° C. In other cases a lower temperature may be employed. The material after being discharged from the percolator preferably is filtered to remove traces of suspended fuller's earth, or whatever other adsorbent material may have been used.

(2) *Contacting process.*—In accordance with this process a suitable amount of fuller's earth or other adsorbent material is introduced into the liquid chlorinated hydrocarbon and distributed by agitation. Ordinarily about 1 to 3% of adsorbent material by weight of the product to be treated is sufficient to effect the desired purification. When this material consists of fuller's earth it should be of a fineness corresponding to about 80 to 300 mesh. The material is stirred into, or otherwise introduced into the chlorinated product at a temperature at which this product has a viscosity of less than 100 seconds Saybolt. When treating pentachlor diphenyl temperatures of about 75° C. to 100° C., or higher are used. After the adsorbent material has remained in contact with the liquid product from about one to several hours the mixture is filtered to remove the fuller's earth or whatever adsorbent or activated material may have been used.

(3) *Combination process.*—In some cases a combination of the two processes above described gives the best results. For example, approximately 1% by weight of fuller's earth (80 to 300 mesh) is stirred into the liquid to be refined at a temperature of high fluidity. After the suspended fuller's earth has been in contact with the halogenated product for approximately 15 to 30 minutes, it is passed through a suitable filter. A filter consisting of porous earth material, such as sintered alumina, is satisfactory.

The finely divided adsorbent material is collected on the filter surface forming a bed or layer through which the liquid being treated is caused to percolate. The percolation treatment is repeated by recirculation until the desired electrical resistivity has been attained.

The accompanying drawing shows in Graph A the change in resistivity effected by the treatment of pentachlor diphenyl at about 100° C. with fuller's earth by the combination or third process. In Graph A the abscissa represents time of treatment plotted in hours and the ordinates represent the resistivity in ohms per c. m. cube times $10^{10}$ measured at 100° C. The ordinates were plotted on a logarithmic scale. As will be noted there is a very sharp rise in resistivity over a period of treatment of about three hours, the resistivity being increased about thirty fold, rising from $2 \times 10^{11}$ ohms per c. m. cube to about $7 \times 10^{12}$ ohms per c. m. cube. Graph B is obtained by plotting the resistivity measurements obtained with a mixture of about 73% hexachlor diphenyl and 27% trichlor benzene by weight. An equally marked rise of resistivity is obtained with this material over a period of treatment of about eight hours. A greater increase is obtainable by continuing the treatment for a longer period of time.

While my purification process has been described with particular reference to chlorine products, it should be understood that products containing other combined halogens may have their resistivity increased by the process of my invention.

What I claim as new and desire to secure by Letters Patent of the United States is:

1. The process of increasing the electrical resistivity of a liquid chlorinated hydrocarbon product having a resistivity of about $3 \times 10^{10}$ ohms per c. m. cube which consists in subjecting said product to contact during a period of about one to eight hours with fuller's earth at an elevated temperature.

2. The process of treating a liquid chlorinated cyclic hydrocarbon which is free from filterable foreign particles in order to increase the electrical resistivity thereof which consists in bringing said hydrocarbon into contact with a finely divided adsorbent material for one to several hours at a temperature of about 75 to 100° C. and then removing said material.

3. The process of refining a liquid halogenated hydrocarbon product containing contaminations unremovable by ordinary filtration which consists in suspending about one per cent by weight of fuller's earth in said product for at least about fifteen minutes, then collecting a bed of said earth upon a filter and circulating said product through said bed for at least about an hour and until a desired electrical resistivity has been attained thereby.

4. The process of purifying chlorinated diphenyl which is free from filterable foreign particles but contains impurities lowering the electrical resistivity thereof which consists in subjecting said product to contact with fuller's earth for a period of about one to eight hours at an elevated temperature.

FRANK M. CLARK.